United States Patent [19]

Carr et al.

[11] Patent Number: 6,040,005

[45] Date of Patent: Mar. 21, 2000

[54] COLORED POLYMERS

[75] Inventors: Kathyrn Carr, Preston; Ian Ferguson, Lancashire, both of United Kingdom

[73] Assignee: Zeneca Limited, London, United Kingdom

[21] Appl. No.: 09/011,611

[22] PCT Filed: Jul. 24, 1996

[86] PCT No.: PCT/GB96/01776

§ 371 Date: Feb. 12, 1998

§ 102(e) Date: Feb. 12, 1998

[87] PCT Pub. No.: WO97/07169

PCT Pub. Date: Feb. 27, 1997

[30] Foreign Application Priority Data

Aug. 12, 1995 [GB] United Kingdom .................. 9516575

[51] Int. Cl.$^7$ ........................................................ B05D 1/00
[52] U.S. Cl. ................................. 427/197; 8/507; 8/647; 427/280; 427/385.5; 106/20 C; 106/20 D
[58] Field of Search ................................. 427/385.5, 280, 427/197; 8/647, 507; 106/20 C, 20 D

[56] References Cited

U.S. PATENT DOCUMENTS 3,458,271  7/1969  Ito et al. .
4,351,871  9/1982  Lewis et al. .............................. 428/195
5,231,135  7/1993  Machell et al. ......................... 525/123

FOREIGN PATENT DOCUMENTS

| 46-007827 | 2/1971 | Japan . |
| 48-012464 | 4/1973 | Japan . |
| 893 731 | 4/1962 | United Kingdom . |
| 922 403 | 4/1963 | United Kingdom . |
| 1 065 961 | 4/1967 | United Kingdom . |

OTHER PUBLICATIONS

Yarmosh et al, Izv. Vyssh. Ucheb. Zaved. Tekhnol. Legk. Prom. 1971, (3), pp 66–68.

Yarmosh et al, Kozh.–Obuv. Prom. (1972), 14(2), pp 29–31.

Chemical Abstracts, vol. 75, No. 20, Nov. 15, 1971, abstract No. 119220k; Yarmosh et al: "Reaction of methylol derivatives of melamines with dyes", p. 47; XP002018789 see abstract & Izv. Vyssh. Ucheb. Zaved., Tekhnol. Legk. Rpom., No. 3, 1971, pp. 66–68.

*Primary Examiner*—Erma Cameron
*Attorney, Agent, or Firm*—Pillsbury Madison & Sutro LLP

[57] ABSTRACT

A colored polymer obtained or obtainable by polymerization of a mixture consisting essentially of a dye and a triazine compound having at least two groups selected from alkoxymethylamino and hydroxymethylamino. The colored polymers may be used in the coloration of plastics, inks and colored reprographic toners.

13 Claims, No Drawings

COLORED POLYMERS

This application is the national phase of international application PCT/GB96/01776 filed Jul. 24, 1996 which designated the U.S.

This invention relates to coloured filters and to coloured polymers, their preparation and uses in various applications, including the colouration of plastics, inks and coloured reprographic toners.

U.S. Pat. No. 5,231,135 describes a method for forming a coloured polymer coating on a substrate, for example an automobile, in which a reactive acrylic polymer containing some reactive colourant and a linking agent is applied to the substrate and allowed to cross-link. The coatings so formed are used to protect the underlying substrates from wear and exposure to sunlight and the elements.

We have now found that valuable colorants can be prepared by polymerisation of certain dyes and triazine compounds. These colorants are useful for plastics, toners and in particular inks.

According to the present invention there is provided a coloured polymer obtained or obtainable by polymerisation of a mixture consisting essentially of a dye and a triazine compound having at least two groups selected from alkoxymethylamino and hydroxymethylamino. Preferably the triazine compound has 2 or 3 groups selected from alkoxymethylamino and hydroxymethylamino. The alkoxymethylamino and hydroxymethylamino groups which are present on the triazine compound are preferably of the formula $-N(R^a)(CH_2OR^b)$ wherein each $R^a$ and $R^b$ independently is H, alkyl (preferably $C_{1-6}$-alkyl), alkoxyalkyl (preferably $-(CH_2)_m-O(CH_2)_nCH_3$ wherein m is from 1 to 6 and n is from 0 to 5), aryl (preferably phenyl) or hydroxyalkyl (preferably $-(CH_2)_mOH$ wherein m is as hereinbefore defined).

A preferred triazine compound having at least two groups selected from alkoxymethylamino and hydroxymethylamino is of the Formula (A):

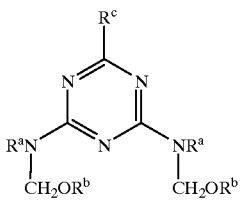

(A)

wherein $R^c$ is alkyl, aryl or preferably a group of formula $-N(R^a)(CH_2OR^b)$, and each $R^a$ and $R^b$ independently is as hereinbefore defined.

In a preferred embodiment $R^c$ is $C_{1-6}$-alkyl, $C_{6-12}$-aryl or preferably $-N(R^a)(CH_2OR^b)$ as hereinbefore defined. Preferably each $R^a$ is H and each $R^b$ is methyl. A particularly preferred triazine compound is tri(methoxymethylamino)-1,3,5-triazine.

The mixture of said dye and triazine compound may contain small quantities of other ingredients which are reactive towards the dye and/or the triazine compound, but it is preferred that the amount of these ingredients is less than 20%, preferably less than 10%, more preferably less than 5% by weight relative to the total weight of dye and triazine compound. It is particularly preferred that the dye and said triazine compound are the only components in the mixture which polymerise to form the coloured polymer. In this way, the polymerisation process is simplified and the resultant polymer is easy to isolate, formulate, handle and has a strong colour. The mixture may contain components which do not form part of the coloured polymer, for example a catalyst or diluents or solvents in which polymerisation takes place.

During polymerisation the dye and the triazine compound react with each other to give the desired coloured polymer. Thus a dye is chosen which has a group which is reactive towards said triazine compound, for example a —SH, primary amino, secondary amino, hydroxy, epoxide, acid, acid halide, labile ester or an activated vinyl group. Preferably the primary amino, secondary amino and hydroxy groups are not attached to aromatic carbon atoms because this lowers their reactivity towards said triazine compound. Activated vinyl groups are preferably of the formula $-COCH=CH_2$ or $-SO_2CH=CH_2$.

Preferred classes of dyes which may be used are dyes of the azo (preferably monoazo or disazo), azomethine, triphenodioxazine, phthalocyanine, benzodifuranone, anthraquinone, indigoid, polymethine quinophthalone, pyrroline and benzofuranone series, provided of course that the dye has a group which is reactive towards said triazine compound.

A preferred dye is an azo dye which is reactive towards said triazine compound, especially an azo dye of Formula (1):

(1)

wherein:

A is an optionally substituted heterocyclic or carbocyclic group; and

D is an optionally substituted heterocyclic or carbocyclic group or a group of Formula (2):

(2)

wherein:

E and G are each independently an optionally substituted heterocyclic or carbocyclic group;

provided that the dye of Formula (1) has a group which is reactive towards said triazine compound.

When A, D, E or G is a heterocyclic group it is preferably selected from thienyl, thiazolyl, isothiazolyl, pyrazolyl, benzopyrazolyl, imidazolyl, pyridyl, pyridonyl, thiadiazolyl, furanyl, pyrrolyl, pyridazyl, pyrimidyl, pyrazinyl, benzothiazolyl, benzoisothiazolyl, quinolinyl, isoquinolinyl, indolyl, pyridothiazolyl, pyridoisothiazolyl, triazolyl, pyrrolyl, dioxazolyl, oxazolyl, isooxazolyl, imidazolyl and carbazolyl. When A, D, E, or G is a carbocyclic group it is preferably optionally substituted phenyl or naphthyl.

The group A is preferably phenyl, pyrazolyl, thiazolyl, pyrrolyl, indolyl or carbazolyl, more preferably optionally substituted phenyl or pyrazolyl.

When A is optionally substituted phenyl it is preferably of Formula (3):

Formula (3)

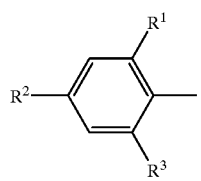

wherein:

R¹, R² and R³ are each independently H, CN, NO₂, halo, CF₃, —SO₂R¹⁸, —SO₂NHR¹⁸, —COOR¹⁸ or —COR¹⁸; and R¹⁸ is H, optionally substituted alkyl or optionally substituted aryl.

It is preferred that each of R¹, R² and R³ independently is F, Cl, Br, CN, —SO₂R¹⁸, —SO₂NHR¹⁸, NO₂, CF₃, —COOR¹⁸ or —COR¹⁸ in which R¹⁸ is as hereinbefore defined.

When A is pyrazolyl it is preferably of Formula (4):

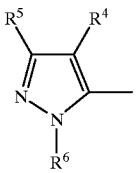

Formula (4)

wherein:

R⁴ is H, —CN, CO₂H, F, Cl, Br, —COR¹⁸, —CONR¹⁸R¹⁹, —SO₂R¹⁸, —SO₂R¹⁸, —SO₂NR¹⁸R¹⁹ or —COOR¹⁸;

R⁵ is H, aryl, —CN, —CH₂CN, —SO₂R¹⁸, alkyl or alkyl substituted by —CN, —CSNR¹⁸R¹⁹, —SR¹⁸ or —COOR¹⁸;

R⁶ is H, alkyl, alkenyl, aryl, —SO₂R¹⁸, —COR¹⁸ or alkyl substituted by —CN or —COOR¹⁸; and R¹⁹ is H, optionally substituted alkyl or optionally substituted aryl.

R⁴ is preferably CN, —COR¹⁸, —CONR¹⁸R¹⁹ or —COOR¹⁸.

R⁵ is preferably phenyl, —CN, or —CH₂CN.

R⁶ is preferably H or C₁₋₄-alkyl, especially H.

The group D is preferably optionally substituted phenyl or pyrazolyl. When D is optionally substituted phenyl it is preferably of Formula (5):

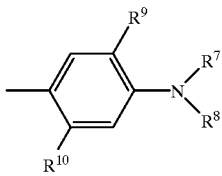

Formula (5)

wherein

R⁷ and R⁸ are each independently H or optionally substituted alkyl or aryl;

R⁹ is H, alkyl, alkoxy, OH, Cl, Br, —COOH, —NHCO-alkyl, NO₂ or —COO-alkyl;

R¹⁰ is H, OH, alkyl, —NR¹⁸R¹⁹, —NHCOR¹⁸, —NHSO₂R¹⁸, —NHCONHR¹⁸, —NHCOOR¹⁸ or —NHCO-alkenyl; and R¹⁸ and R¹⁹ are as hereinbefore defined.

The substituents which may be present on R⁷ and R⁸ are preferably selected from OH, COOH, —COO-alkyl, CN, phenyl, phenoxy, alkoxy, alkyl, Cl, Br, SH, alkenyl, alkynyl, CHF₂, NH₂, —NH-alkyl, epoxy, —CO-alkenyl and —NHCO-alkenyl.

Preferably R⁷ and R⁸ are each independently optionally substituted C₁₋₁₀-alkyl, more preferably C₁₋₈-alkyl or C₁₋₆-hydroxyalkyl and especially a-branched C₁₋₈-alkyl or C₁₋₆-hydroxyalkyl.

R⁹ is preferably H, C₁₋₄-alkyl, C₁₋₄-alkoxy, NO₂, COOH or —COO(C₁₋₄-alkyl), more preferably H, OCH₃, NO₂, CH₃, COOH or COOCH₃.

R¹⁰ is preferably H, C₁₋₄-alkyl or —NHCO(C₁₋₄-alkyl), more preferably H, CH₃ or —NHCOCH₃.

When D is pyrazolyl it is preferably of Formula (6):

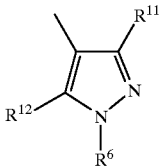

Formula (6)

wherein:

R¹¹ is H, alkyl or aryl;

R¹² is NH₂ or —NH-alkyl; and

R⁶ is as hereinbefore defined.

R¹¹ is preferably H or C₁₋₄-alkyl, more preferably C₁₋₄-alkyl.

R¹² is preferably NH₂ or —NH-(C₁₋₄-alkyl), more preferably NH₂.

E is preferably optionally substituted phenylene, thienyl or isothiazolylene, especially phenylene of Formula (7):

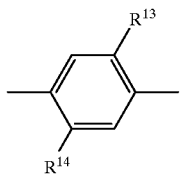

Formula (7)

wherein:

R¹³ is H, OH, alkoxy, alkoxyalkoxy, —NHCOR¹⁸ or —NHSO₂R¹⁸; and

R¹⁴ is H, alkyl-NHCO-alkyl or —NHCO-aryl.

R¹³ is preferably H, C₁₋₆-alkoxy or C₁₋₆-alkoxy-C₁₋₆-alkoxy.

R¹⁴ is preferably H, OH, C₁₋₆-alkyl, —NHCO(phenyl) or —NHCO(C₁₋₆-alkyl)

The group G is preferably optionally substituted phenyl or pyrazolyl, especially of Formula (5) or Formula (6).

When a group represented by R¹, R², R³, R⁵, R⁶, R⁹, R¹⁰, R¹¹, R¹², R¹³, R¹⁴, R¹⁸ or R¹⁹ is or contains an alkyl or alkoxy group it is preferably C₁₋₆-alkyl or C₁₋₆-alkoxy.

Where a group represented by R⁵, R⁶, R⁷, R⁸, R¹¹, R¹⁸ or R¹⁹ is or contains an aryl group, the aryl group is preferably a phenyl or naphthyl group, more preferably a phenyl group.

Where a group represented by R⁶, R⁷, R⁸, R¹⁰ is or contains an alkenyl group it is preferably C₂₋₆-alkenyl, especially vinyl or allyl.

Where a group represented by R⁷ or R⁸ contains an alkynyl group it is preferably C₂₋₆-alkynyl.

The alkyl or alkoxy group or substituents containing alkyl or alkoxy groups represented by any one of R, R¹ to R³ and R⁵ to R¹⁴, R¹⁶, R¹⁸ and R¹⁹ may be straight or branched chain.

When any of the groups represented by A, D, E, G and R¹ to R³, is optionally substituted the substituents are preferably selected from F, Cl, Br, I, NO₂, CN, CF₃, —SO₂F, —OR¹⁸, —SR¹⁸, —NR¹⁸R¹⁹, —COOR¹⁸, —SO₂R¹⁸, —COR¹⁸, —SO₂NR¹⁸R¹⁹, —CONR¹⁸R¹⁹, —NHCOR¹⁸, —NHSO$_2$R$^{18}$, —NHCOOR$^{18}$, C$_{1-6}$-alkyl and C$_{1-6}$-alkoxy in which R$^{18}$ and R$^{19}$ are as hereinbefore defined.

Where R$^{18}$ and R$^{19}$ is optionally substituted the substituents are preferably selected from F, Cl, Br, NO$_2$, CN, CF$_3$, SO$_2$F, OPh, OC$_{1-6}$-alkyl and C$_{1-6}$-alkyl.

Especially preferred azo dyes are of Formulae (8) and (9):

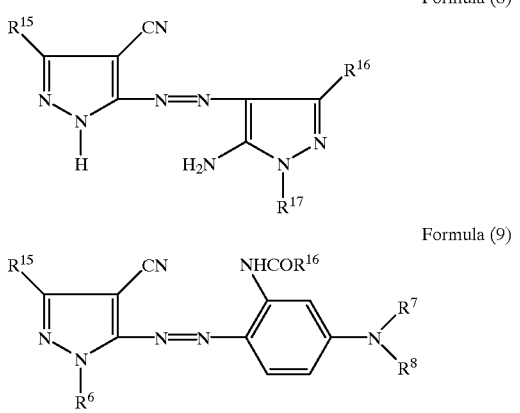

Formula (8)

Formula (9)

wherein:

R$^{15}$ is H, C$_{1-4}$-alkyl, phenyl, C$_{1-4}$-cyanoalkyl or —CN;

R$^{16}$ is C$_{1-4}$-alkyl;

R$^{17}$ is H or phenyl; and

R$^6$, R$^7$ and R$^8$ are as hereinbefore defined.

A specific example of a dye of Formula (8) is Dye 1 in which R$^{15}$ is —CN, R$^{16}$ is t-butyl and R$^{17}$ is phenyl.

Specific examples of dyes of Formula (9) are Dye 2 in which R$^6$ is —H, R$^7$ is ethyl, R$^{16}$ is methyl, R$^8$ is ethyl and R$^{15}$ is —CN; and Dye 3 in which R$^6$ is —H, R$^7$ is ethyl, R$^{16}$ is methyl, R$^8$ is 1-methylpropyl and R$^{15}$ is phenyl.

A preferred dye of the phthalocyanine series is of Formula (10):

MPc[XR$^{20}$]$_n$     (10)

wherein:

M is H, Si, Ge, metal, oxymetal, hydroxymetal or halometal;

Pc is a phthalocyanine chromophore;

X is a divalent heteroatom or a divalent linking group;

R$^{20}$ is H or a substituent; and n is from 1 to 16;

provided that the dye of Formula (10) has a group which is reactive towards said triazine compound.

The species M is preferably selected from H, a transition metal, a halometal, Si or Ge and more preferably H, Ni, Cu, Mn, Fe, Sn, Co, Ti, V, (halo)Al (e.g. as Al(Cl)), (halo)In (e.g. In(Cl)), Si and Ge, especially Cu or Ni.

The group X is preferably O or S or a group containing one or a pair of linked heteroatoms selected from N, O and S, especially —NR—, —CO.O—, —SO$_2$.O—, —SO$_2$—, —SO$_2$.NH—.

Where R$^{20}$ is other than H it is preferably selected from alkyl, especially C$_{1-4}$-alkyl; aryl, especially phenyl; epoxy, —CO-C$_{2-6}$-alkenyl, especially acryloyl; —NHCO-C$_{2-6}$-alkenyl, especially acryloylamido; or, where X is NR, R and R$^{20}$ may be linked to form, with the N atom, a 5-, 6- or 7-membered heterocycle.

The value of n is preferably from 1 to 8, more preferably from 1 to 4 and especially 2, 3 or 4. A preferred phthalocyanine is a tetra(sulphonamido)phthalocyanine, especially one in which X is —SO$_2$NH— or —S— and R$^{20}$ is selected from C$_{1-4}$-hydroxyalkyl, C$_{1-4}$-aminoalkyl and C$_{1-4}$-carboxyalkyl.

Preferably the group which is reactive towards the triazine compounds is isolated from the chromophore, for example by an alkylene group, because the reaction of this type of dye with the polymer precursor does not cause any appreciable change in colour.

Dyes used in the present invention may be prepared by conventional means, for example the monoazo and disazo dyes may be formed by diazotisation of an amine and coupling.

Phthalocyanines of Formula MPc(XR$^{20}$)$_n$ may be prepared by procedures which are analogous to those known in the art, for example by heating copper phthalocyanine with chlorosulphonic acid, then with phosphorus pentachloride, to form copper phthalocyanine tetra(sulphonylchloride), followed by condensation with an amine having groups which are reactive towards said triazine compound. The condensation can be performed in a liquid medium if desired, e.g dioxane.

Further examples of dyes which can be used in the mixtures to form a coloured polymer are described in U.S. Pat. No. 5,231,135, structures A (in Table 1) to V inclusive, which are incorporated herein by reference thereto.

Polymerisation of the mixture comprising a dye and said triazine compound is preferably initiated thermally or chemically, for example by heating the mixture. Preferred thermal initiation comprises heating the mixture to a temperature sufficient to induce polymerisation of the dye and triazine compound, preferably from 40° C. to 250° C., more preferably from 50° C. to 200° C., and especially from 50°–100° C.

The ratio of dye to said triazine compound in the mixture depends on their relative molecular weights and the number of reactive groups each contains. Preferably the ratio of dye and said triazine compound by weight lies in the range 1:0.1 to 1:10, more preferably 1:0.5 to 1:2.5.

The polymerisation is preferably performed in a solvent or diluent, especially water or an organic solvent, for example an alkanol or an aliphatic ketone, or a mixture comprising water and an organic solvent. In a preferred process, a solution of the dye and the triazine compound in a solvent is heated, preferably at the aforementioned temperatures, and the coloured polymer precipitates from the solution and is collected. The precipitate may be collected by any convenient means, for example by filtration.

The polymerisation is preferably performed at a pH below 7, for example at a pH of from 2.5 to 5, preferably from 3 to 4. Any unreacted starting material may be removed from the product by washing. Unreacted triazine compound may be removed from the coloured polymer by washing with an organic solvent, for example acetone, and unreacted water-soluble dye may be removed from the coloured polymer by washing with water or dilute alkali, for example dilute sodium hydroxide solution.

The coloured polymer obtainable by the process described above is highly insoluble and consequently analysis to determine its chemical structure is not easy. Without wishing to restrict the scope of the present invention by limitation to any theory, however, it is probable that the polymer comprises units of various sizes in which up to ten or more reactant molecules are linked together. Thus for example, a dye having two —CH$_2$CH$_2$OH groups could react with two trimethoxymethylmelamine molecules, then the two free —NHCH$_2$OCH$_3$ groups on each triazine ring can react with further molecules of the dye, then newly added dye molecules can react with further molecules of trimethoxymethylmelamine, and so on until a coloured polymer results containing dye molecules on triazine rings linked by —NHCH$_2$OCH$_2$CH$_2$— groups.

The coloured polymer provided by the invention has a number of possible applications. The polymer may be used for colouring plastics, inks for writing and printing or as a constituent of a colour toner for use in electrophotography. The coloured polymer can be readily dispersed in organic and aqueous media. This invention has an advantage over conventional pigments in that it can be used to provide a wider variety of colours.

According to a further aspect of the present invention there is provided an ink comprising a liquid medium and particles dispersed therein of a coloured polymer obtained or obtainable by polymerisation of a mixture comprising or consisting essentially of a dye and a triazine compound having at least two groups selected from alkoxymethylamino and hydroxymethylamino.

The coloured polymer obtained or obtainable by polymerisation of a mixture comprising or consisting essentially of a dye and said triazine compound is preferably in particulate form and has a particle size of less than 15 microns, more preferably 0.01 to 10 microns, especially 0.04 to 5 microns, more especially 0.05 to 1 mm, particularly 0.05 to 0.3 microns. These sizes are preferred to enable the coloured polymer particles to pass through ink jet printer nozzles which typically have a diameter of 10 to 50 microns.

When the particles of coloured polymer are obtained or obtainable by polymerisation of a mixture comprising a dye and said triazine compound the mixture may contain other ingredients which are reactive towards the dye and/or the triazine compound. Examples of such other ingredients are described below as film-forming ingredients and film-forming resins. However, it is preferred that the mixture consists essentially of a dye and said triazine compound because the resultant coloured polymer is easier to prepare, isolate, formulate, handle and has good intensity of colour.

The ink preferably contains from 0.5% to 20%, more preferably from 0.5% to 15%, and especially from 1% to 5%, by weight of coloured polymer(s) based on the total weight of the ink. The ink may contain more than one coloured polymer, for example two or three such polymers.

The liquid medium is preferably an organic solvent or, more preferably, water or an aqueous medium comprising a mixture of water and one or more water-soluble organic solvents, preferably in a weight ratio of water to the solvent(s) from 99:1 to 1:99, more preferably from 95:5 to 50:50 and especially from 90:10 to 60:40.

Each water-soluble organic solvent is preferably a $C_{1-4}$-alkanol, e.g. methanol, ethanol, n-propanol, isopropanol, n-butanol, sec-butanol, tert-butanol or isobutanol; an amide, e.g. dimethylformamide or dimethylacetamide; an ester, e.g. diacetine; a ketone or ketoalcohol, e.g. acetonemethylethylketone, methylisobutyl ketone or diacetone alcohol; an ether, e.g. tetrahydrofuran or dioxane; a polyalkylene glycol, e.g. polyethylene glycol or polypropylene glycol preferably having molecular weights up to 1000 and especially from 100 to 500; an alkylene glycol containing 2 to 6 carbon atoms, e.g. ethylene glycol, propylene glycol, butylene glycol or triethylene glycol or diethylene glycol and thioglycol and the diglycol equivalent thereof; a polyol e.g. glycerol or 1,2,6-hexanetriol; a lower alkyl ether of a polyhdric alcohol, e.g. 2-methoxyethanol, 2-[2-(2-methoxyethoxy)ethoxy]ethanol or 2-[2-(2-ethoxyethoxy)-ethoxy]-ethanol; a heterocyclic ketone, e.g. 2-pyrrolidone or N-methylpyrrolidone. The liquid medium preferably contains from 1 to 5 water-soluble organic solvents, more preferably 1,2 or 3 such solvents.

Preferred water-soluble organic solvents are selected from heterocyclic ketones, especially 2-pyrrolidone and N-methylpyrrolidone; alkylene glycols or lower alkyl ethers of polyhydric alcohols, especially ethylene glycol, diethylene glycol, triethylene glycol and 2-methoxy-2-ethoxy-2-ethoxyethanol; and polyethylene glycols having a molecular weight from 100 to 500. A preferred specific solvent mixture is a binary mixture of water and either diethylene glycol, 2-pyrrolidone or N-methylpyrrolidone in a weight ratio as mentioned above.

Examples of suitable ink media are given in U.S. Pat. No. 4,963,189, U.S. Pat. No. 4,703,113, U.S. Pat. No. 4,626,284 and EP 425,150A.

When the liquid medium is water or an aqueous medium it preferably contains a hydrophillic surfactant which assists dispersion of the coloured polymer. Suitable dispersants include aromatic species having a hydrophillic chain, for example a poly(alkyleneoxy) chain; homo- or hetero-poly (alkylenenoxylates); lignin sulphonates; and formaldehyde-arylsulphonic acid adducts.

The liquid medium may also be an organic solvent which may be more or less polar depending upon the nature of the substrate and the performance requirements of the ink. Such non-aqueous inks preferably contain a dispersant to assist stabilisation of the dispersed coloured polymer. Suitable dispersants include those having polyester and/or polyether chains having an affinity for organic solvents liquids and groups which have an affinity for the coloured polymer. Examples of such dispersants include SOLSPERSE 13000, preferred in non-polar solvents, and SOLSPERSE 24000, preferred in more polar media (e.g. esters and ketones).

Preferably the ink also contains a film-forming resin or film-forming ingredients, especially an air-curable or thermally curable film-forming resin, to improve the adhesion of the coloured polymer to substrates. The preferred film-forming resin will depend upon the nature of the liquid medium, different types of resins being generally employed for aqueous and non-aqueous liquid media.

Preferred film-forming resins for use in water and inks aqueous are air-curable acrylics (e.g. the NEOCRYL resins) and photo-curable polyesters or urethanes (e.g. the NEO-RAD resins).

Preferred film-forming resins for use in non-aqueous inks are alkyd resins (air-curable or isocyanate curing) e.g. those sold under the name SYNOLAC, thermosetting acrylics (e.g. SYNACRYL), urethanes (thermosetting) e.g. those sold under the name UNITHANE, and polyesters (thermosetting) e.g. those sold under the name SYNOLAC. To prepare the ink, the coloured polymer is preferably pulverised and dispersed in the liquid medium, preferably in the presence of a surfactant.

The film-forming ingredients preferably comprise a mixture of an organic monomer, comonomer, pre-polymer, uncured polymer or copolymer and mixtures thereof which is capable of polymerisation and/or cross-linking. Where mixtures of different polymer precursors are used, preferably at least one of the polymer precursors is capable of reacting with the coloured polymer. Examples of polymer precursors include acrylates, methacrylates, acrylamides, methacrylamides, epoxides, esters, urethanes, isocyanates, alcohols, vinylalcohols, imides, amides, phenols, acetates, carbonates and their derivatives, amines, carboxylic acids and orthoformaldehyde condensates, polyacrylic resins, polyvinylalcohol resins, melamine formaldehyde resin condensates, alkyd resins, epoxy resins, polyimides, polyamide resins, phenolic resins, polyester resins, polyvinylacetate, polycarbonate resins, urethane resins and their derivatives and copolymers.

The film-forming ingredients preferably include one or more components selected from acrylamides, epoxides, epoxy resins, acrylamide/epoxy resin systems, melamine formaldehyde resin condensates, polyester, alkyd resins, hydroxylated or carboxylated acrylics, hydroxylated acrylic-melamine formaldehyde systems and especially from acrylamide/epoxy resin systems and hydroxylated acrylic-melamine formaldehyde systems.

Polymerisation of the film-forming ingredients is preferably caused by chemical, photochemical, or thermal means, as discussed above in relation to preparation of the colour polymer. Preferably curing is thermal, the conditions being as described above for the preparation of the coloured polymer.

The ink may further contain one or more pigments for modifying the shade of the inks. However, where the coloured polymers are characterised by strong, bright, fast shades, it is preferred not to incorporate pigments which will detract in any way from these desirable properties.

A further feature of the invention provides a process for the colouration of a substrate comprising applying thereto an ink or a coloured polymer according to the invention.

The ink may be applied to a substrate by a printing process, preferably by a flexographic, off-set lithographic, gravure, intaglio, ink-jet or screen printing processes, especially by ink jet printing. The resultant prints have bright, strong images with good fastness properties. The principles and procedures for ink jet printing are known in the art, for example in High Technology Applications of Organic Colorants, P. Gregory, Chapter 9 ISBN 0-306-43637-X.

Suitable substrates are transparent or opaque, for example paper, which may be plain or treated to enhance the properties of the ink thereon, textiles and overhead projector slides. The present ink has the advantage of giving good performance even on substrates which have not been subjected to any special pre-treatments.

In a further aspect, the present invention provides a process for preparing an optical filter comprising applying a red, green and/or blue an ink according to the invention to a transparent substrate, preferably by a printing process, especially by an ink jet printing process, in a pattern suitable for a colour filter. Preferably the ink contains film-forming ingredients described above.

Preferably the transparent substrate is glass or plastic, and preferably the printing process comprises ink-jet printing.

Optical filters, also known as colour filters, are used in liquid crystal displays, for example those used in small television receivers.

A preferred process for preparing an optical filter comprises the steps of:
  (a) forming a plurality of discrete filter regions on a transparent substrate wherein at least one of the regions is coloured using a red, green or blue ink according to the invention; and
  (b) heating or ageing the product of step (a) thereby removing the liquid medium from the ink.

The discrete filter regions described in step (a) can be formed by applying a uniform coating of the ink on the substrate and subsequently removing some of the ink to give the desired filter region. Alternatively the discrete filter regions can be formed by applying the ink in the desired pattern on the substrate, preferably by an ink jet printing process.

The preferred optical filter comprises a transparent substrate bearing triads consisting of a red, green and a blue elements.

Where the process used for forming the discrete filter regions on the substrate is ink-jet printing, it is possible to achieve printing of all three primary colours (red, green and blue) simultaneously to form triads or any desired grouping of filter elements.

The invention is further illustrated by the following Examples.

EXAMPLE 1

Preparation of Coloured Polymer

A solution of a phthalocyanine dye (0.1 g) having the following structure:

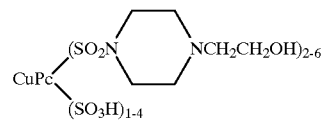

and tri(methoxymethylamino)-1,3,5-triazine (90% in butanol; 0.25 g) in water was adjusted to pH 3–4 using concentrated hydrochloric acid and warmed to 50–55° C. for a period of 45 minutes. During this time, a coloured polymer precipitated from solution. After cooling, the coloured polymer was filtered-off. The coloured polymer was twice vigorously agitated with dilute sodium hydroxide solution to remove unreacted dye, washed with cold water, then vigorously agitated with acetone to remove any excess triazine compound, collected, and dried to give 0.2 g of a coloured polymer having a bright cyan colour.

Ink Preparation

The coloured polymer (1 g) was dispersed in water (3.5 ml) in the presence of a surface-active agent comprising a beta-naphthol-polyethylene oxide adduct (0.5 g), using glass beads (5 mm diameter) and a laboratory shaker. The resultant ink was bar-coated onto paper giving a bright cyan print which showed instant 100% water-fastness.

EXAMPLES 2 TO 4

Following the general procedure described in Example 1, further coloured polymers were prepared by reaction of tri-(methoxymethylamino)-1,3,5-triazine with dyes of the following formulae:

Formula (11)

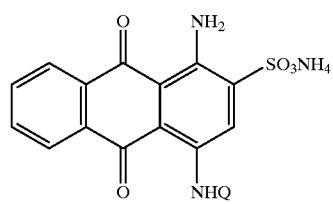

| Example | Q |
|---|---|
| 2 | p-C$_6$H$_4$.OCH$_2$CH$_2$OH |
| 3 | m-C$_6$H$_4$.SO$_2$NHCH$_2$CH$_2$OH |
| 4 | m-C$_6$H$_4$.SO$_2$N(CH$_2$CH$_2$OH)$_2$ |

EXAMPLES 5 TO 7

The method of Example 1 was repeated except that in place of the phthalocyanine dye there was used dyes of formula 12, 13, 14:

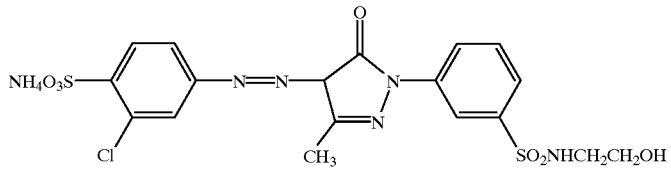

Formula(12)

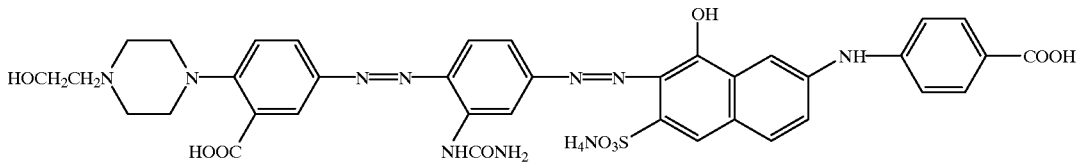

Formula(13)

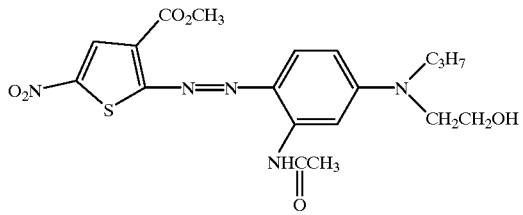

Formula(14)

We claim:

1. A colour filter or reprographic toner which comprises a coloured polymer corresponding to the polymer obtained by polymerisation of a mixture comprising a dye and a triazine compound having at least two groups selected from the class consisting of alkoxymethylamino and hydroxymethylamino.

2. A colour filter or reprographic toner according to claim 1 wherein the dye is selected from the group consisting of dyes of the azo, azomethine, triphenodioxazine, phthalocyanine, benzodifuranone, anthraquinone, indigoid, polymethine, quinophthalone, pyrroline and benzofuranone series and the dye has a group which is reactive towards the triazine compound.

3. A colour filter or reprographic toner according to claim 1 wherein the triazine compound is of the Formula (A):

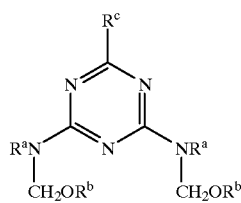

wherein $R^c$ is selected from the group consisting of alkyl, aryl and substituents of formula $-NR(R^a)(CH_2OR^b)$; and each $R^a$ and $R^b$ independently is selected from the group consisting of H, alkyl, alkoxyalkyl, hydroxyalkyl and aryl.

4. A colour filter or reprographic toner according to claim 1 wherein the triazine compound is tri(methoxymethylamino)-1,3,5-triazine.

5. A colour filter or reprographic toner according to claim 1 wherein the coloured polymer is in particulate form having a particle size of less than 15 microns.

6. A colour filter or reprographic toner according to claim 1 which further contains a film-forming resin or film-forming ingredients.

7. A process for preparing a colour filter according to claim 1 comprising applying a red, green and/or blue ink comprising a liquid medium and particles dispersed therein of a coloured polymer corresponding to the polymer obtained by polymerisation of a mixture comprising a dye and a triazine compound having at least two groups selected from the class consisting of alkoxymethylamino and hydroxymethylamino to a transparent substrate in a platen suitable for a colour filter.

8. A process for preparing an optical filter according to claim 1 comprising the steps of:

(a) forming a plurality of discrete filter regions on a transparent substrate wherein at least one of the regions is coloured using a red, green or blue ink comprising a liquid medium and particles dispersed therein of a coloured polymer corresponding to the polymer obtained by polymerisation of a mixture comprising a dye and a triazine compound having at least two groups selected from the class consisting of alkoxymethylamino and hydroxymethylamino; and (b) heating or ageing the product step of (a) thereby removing the liquid medium from the ink.

9. A process according to claim 8 wherein the ink is applied to the substrate by an ink jet printing process.

10. A colour filter or reprographic toner according to claim 1, wherein the mixture from which the coloured polymer is obtained comprises no more than 20% (relative to the total weight of the dye and the triazine compound) of other ingredients which are reactive to the dye and/or the triazine compound.

11. A colour filter or reprographic toner according to claim 1, wherein the coloured polymer is obtained by polymerisation of a mixture consisting essentially of a dye and a triazine compound having at least two groups selected from alkoxymethylamino and hydroxymethylamino.

12. In a method involving the use of a reprographic toner, the improvement wherein said toner is one according to claim 1.

13. An ink comprising a liquid medium and particles dispersed therein of a coloured polymer corresponding to the polymer obtained by polymerisation of a mixture comprising a dye and a triazine compound having at least two groups selected from the class consisting of alkoxymethylamino and hydroxymethylamino wherein the ink comprises from 0.5% to 20% of the coloured polymer based on the total weight of the ink; and the coloured polymer has a particle size of less than 15 microns.

* * * * *